United States Patent [19]
Sung

[11] Patent Number: 6,101,004
[45] Date of Patent: Aug. 8, 2000

[54] SCANNING DEVICE

[76] Inventor: Hsiung-Wei Sung, No. 1568, Sec.1, Chung-Shan Rd., Chin-Hu Tsun, Kuan-Yin Hsiang, Tao-Yuan Hsien, Taiwan

[21] Appl. No.: 09/015,954

[22] Filed: Jan. 30, 1998

[51] Int. Cl.$^7$ ...................................................... H04N 1/04
[52] U.S. Cl. ........................... 358/497; 358/494; 358/474; 358/487
[58] Field of Search .................................... 358/474, 498, 358/487, 505, 400, 449, 496, 494, 497; 382/321

[56] References Cited

U.S. PATENT DOCUMENTS

| | | | |
|---|---|---|---|
| 4,689,693 | 8/1987 | Watanabe | 358/285 |
| 4,893,196 | 1/1990 | Koshiyouji et al. | 358/474 |
| 4,931,862 | 6/1990 | Nakao et al. | 358/75 |
| 5,119,212 | 6/1992 | Mori et al. | 358/474 |
| 5,907,413 | 5/1999 | Han | 358/497 |
| 5,914,791 | 6/1999 | Lin | 358/498 |

*Primary Examiner*—Joseph Mancuso
*Assistant Examiner*—Hien Truong

[57] ABSTRACT

A scanning device for a computer includes a case body, a transparent scanning panel, a transparent viewing panel, and a scanning module unit. The case body includes a broad upper wall and a broad lower wall, and has a columnar hollow space which extends downwardly from the broad upper wall to the broad lower wall so as to form upper and lower annular edge portions respectively in the upper and lower walls. The upper and lower walls respectively define upper and lower annular openings. The scanning panel is fitted to the upper annular edge portion to cover the upper annular opening and defines a scanning area with a first size indicating mark. The viewing panel is fitted to the lower annular edge portion to cover the lower annular opening so as to define a viewing area through which the first size indicating mark is visible. The scanning module unit is disposed in the case body for producing a scanning line on the image and transforms the scanned image into a digital representation for processing by the computer.

4 Claims, 5 Drawing Sheets

SCANNING DEVICE

BACKGROUND OF THE INVENTION

1. Field of the Invention

The invention relates to a scanning device, more particularly to an optical scanning device for scanning an image to be processed by a computer.

2. Description of the Related Art

Referring FIG. 1, a conventional scanning device 1 is used for scanning an image to produce a digital representation which is adapted to be received by a computer. As illustrated, the conventional scanning device 1 includes a case body 3, a transparent scanning panel 5, and a scanning module unit (not visible). The case body 3 includes a broad upper wall 2A and a broad lower wall 2B which is disposed parallel to and which is spaced from the broad upper wall 2A, and has a columnar hollow space which extends downwardly from the broad upper wall 2A to the broad lower wall 2B so as to form an upper annular edge portion that defines an upper annular opening in the upper wall 2A. The transparent scanning panel 5 is fitted to the upper annular edge portion to cover the upper annular opening and defines a scanning area 5A with a size indicating mark on an upper major surface thereof. The scanning module unit is disposed in the case body 3 outboard to the scanning area 5A for producing a scanning line on the image and for transforming the scanned image into a digital representation adapted to be processed by the computer.

In use, the image 2 is placed on the scanning area 5A of the transparent scanning panel 5 after which a cover member 4 is superimposed on the image 2 in order to position the latter in the scanning area SA. The scanning module unit will scan the image 2 and transform the same into the digital representation which is received by the computer. In the event that the image is larger than the size indicating mark and thus exceeds the scanning area 5A, a portion of the image will be left unscanned. The user cannot precisely determine the size of the unscanned portion of the image.

SUMMARY OF THE INVENTION

The object of this invention is to provide a scanning device for a computer which is capable of obviating the aforementioned drawback that is associated with the conventional scanning device.

Accordingly, a scanning device for scanning an image, includes a case body, a transparent scanning panel, a transparent viewing panel, and a scanning module unit. The case body includes a broad upper wall and a broad lower wall which is disposed spacedly from and parallel to the broad upper wall, and has a columnar hollow space which extends downwardly from the broad upper wall to the broad lower wall so as to form an upper annular edge portion and a lower annular edge portion respectively in the upper and the lower walls. The upper and lower walls respectively define an upper annular opening and a lower annular opening. The transparent scanning panel is fitted to the upper annular edge portion to cover the upper annular opening, and defines a scanning area with a first size indicating mark on an upper major surface of the scanning panel. The transparent viewing panel is fitted to the lower annular edge portion to cover the lower annular opening so as to define a viewing area through which the first size indicating mark is visible. The scanning module unit is disposed in the case body for producing a scanning line on the image, and transforms the scanned image into a digital representation which is adapted to be processed by a computer. The scanning module unit is disposed adjacent to and under the broad upper wall and outwardly of the scanning area, and is movable in a transverse direction relative to the columnar hollow space. The case body is movable so as to juxtapose the upper major surface of the transparent scanning panel with the image to permit viewing of the actual boundary of the scanned area of the image via the viewing area of the viewing panel.

BRIEF DESCRIPTION OF THE DRAWINGS

Other features and advantages of this invention will become more apparent in the following detailed description of the preferred embodiment of this invention with reference to the accompanying drawings, in which.

DETAILED DESCRIPTION OF THE PREFERRED EMBODIMENT

Figure 1:
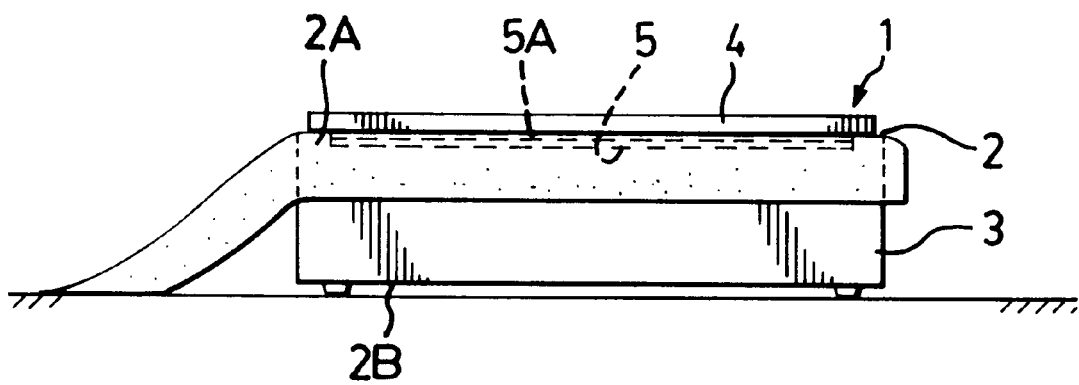
FIG. 1 is a schematic view of a conventional scanning device for a computer.
Figure 2:
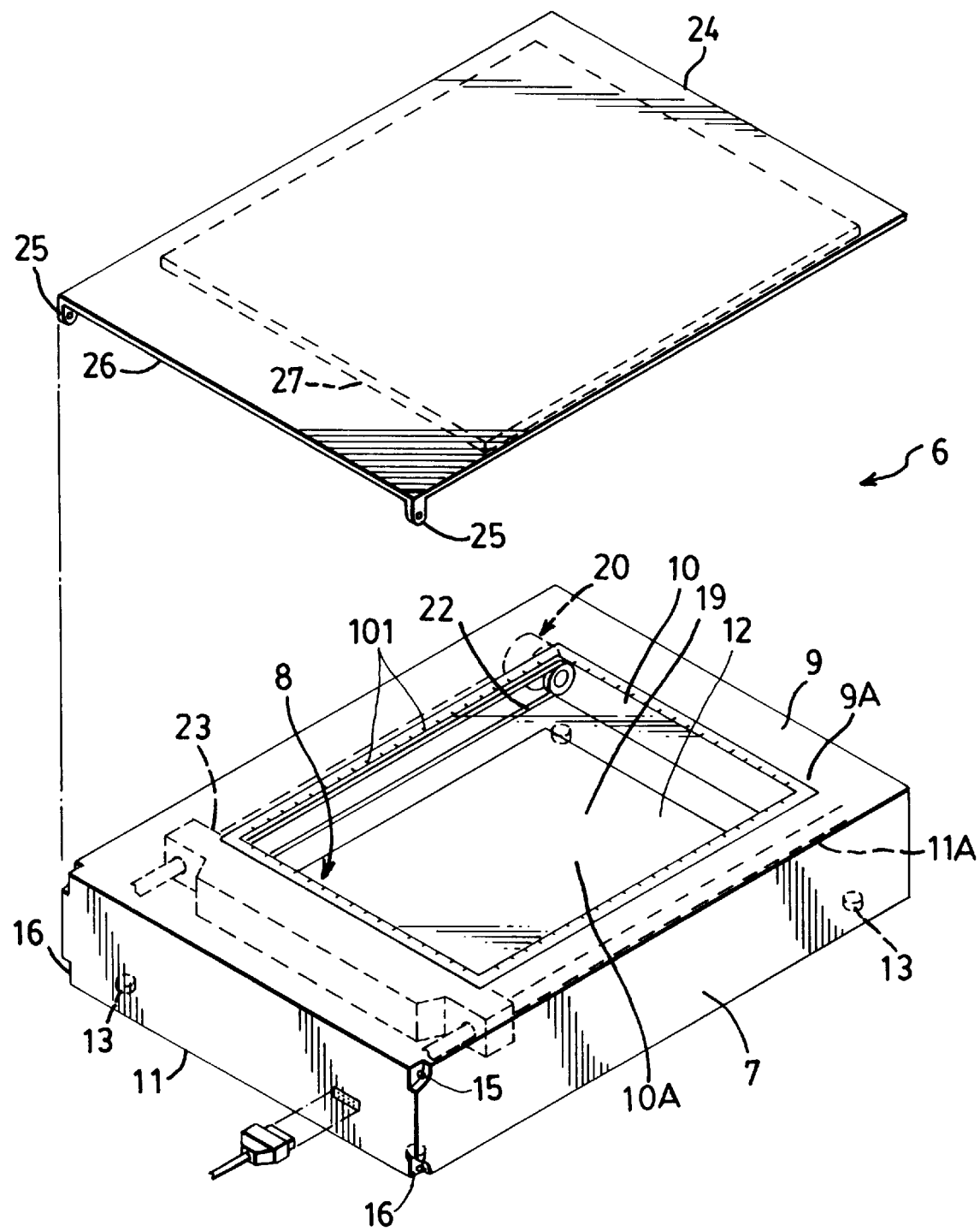
FIG. 2 is a perspective view of a preferred embodiment of a scanning device of this invention for a computer, illustrating the preferred embodiment in a normal state.
Figure 3:
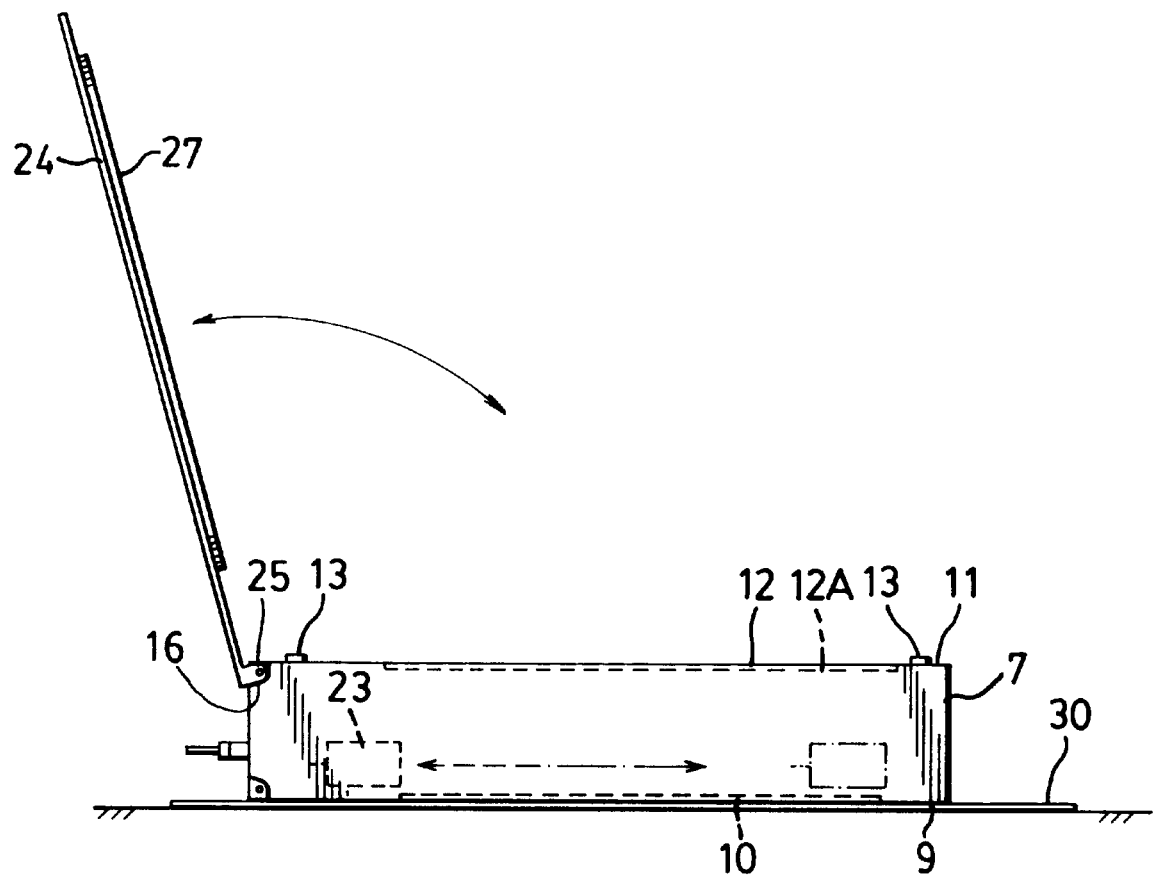
FIG. 3 is a side view of the preferred embodiment, illustrating the preferred embodiment when superimposed on an image.

Referring to FIGS. 2 and 3, the preferred embodiment of a scanning device 6 according to this invention for scanning an image is shown to include a case body 7, a transparent scanning panel 10, a transparent viewing panel 12, and a scanning module unit 8.

The preferred embodiment is to be used with a computer (not shown). The case body 7 includes a broad upper wall 9 and a broad lower wall 11 which is spaced from parallel to the upper wall 9, and has a columnar hollow space 19 which extends downward from the broad upper wall 9 to the broad lower wall 11 so as to form an upper annular edge portion 9A and a lower annular edge portion 11A respectively in the upper and lower walls 9, 11. The upper and lower annular edge portions 9A, 11A respectively define an upper annular opening and a lower annular opening.

The transparent scanning panel 10 is fitted to the upper annular edge portion 9A to cover the upper annular opening, and defines a scanning area 10A with a first size indicating mark 101 on an upper major surface of the scanning panel 10.

The transparent viewing panel 12 is fitted to the lower annular edge portion 11A to cover the lower annular opening so as to define a viewing area 12A through which the first size indicating mark 101 is visible.

The scanning module unit 8 produces a scanning line on the image 30 and transforms the scanned image into a digital representation that is adapted to be processed by the computer. The scanning module unit 8 is disposed adjacent to and under the broad upper wall 9 so as to be disposed outwardly of the scanning area 10A. The scanning module unit 8 is movable in a transverse direction relative to the columnar hollow space 19.

As best shown in FIG. 3, the case body 7 can be moved so as to juxtapose the upper major surface of the transparent scanning panel 10 with the image 30. Under such a condition, the user can view the actual boundary of the scanned area of the image 30 via the viewing area 12A of the viewing panel 12. Thus, the user is able to determine which parts of the image 30 falls out of the scanning area 10A. The scanning module unit 8 (see FIG. 2) will scan the image 30 and automatically transform the scanned image into the digital representation for processing by the computer. The scanning module unit 8 includes an image sensitive optic member 23 disposed outwardly of the scanning area 10A, a driving motor 20, and a transmission belt 22 trained on the motor 20 and the image sensitive optic member 23 such that the latter will move transversely across the image 30 upon actuation of the driving motor 20. The structure and operation of the scanning module unit 8 are known in the art and will not be detailed herein.

In the preferred embodiment, the upper major surface of the transparent scanning panel 10 is flush with an upper surface of the broad upper wall 9. The transparent scanning panel 10 further includes a second size indicating mark 102 (see FIG. 4) which is formed on a lower major surface thereof and which is registered with the first size indicating mark 101.

The scanning device further includes a light impervious cover member 24 of a dimension larger than the viewing area 12 A, and has a connecting lateral side 26 which is formed with pivot ears 25 detachably hinged on the case body 7 at one side 15, 16 thereof and adjacent to the lower wall 11 (see FIG. 2) such that the impervious cover member 24 can be brought to abut against the periphery that confines the viewing area 12A when the upper major surface of the transparent scanning panel 10 is superimposed upon the image 30. Alternately, the connecting lateral side 26 of the impervious cover member 24 can be detachably hinged on the case body 7 adjacent to the upper wall 9 such that the impervious cover member 24 can be brought to abut against the periphery that confines the scanning area 10A of the transparent scanning panel 10 in a normal state of use.

Note that the case body 7 further includes a plurality of vertical studs 13 disposed on corners of the broad lower wall 11 at an outer perimeter portion of the viewing area 11A. When the scanning device of this invention is in a state of unuse, the scanning area 10A of the transparent scanning panel 10 needs to be covered so as to prevent the same from being scratched. With the upper major surface of the scanning area 10A facing upward, the impervious cover member 24 can be mounted on the case body 7 for covering the scanning area 10A. The impervious cover member 24 further includes a cover pad 27 disposed thereon which has a thickness greater than the height of the vertical studs 13 such that the cover pad 27 can abut against the viewing area 12A to prevent light from entering into the case body 7 through the viewing area 12A when the scanning device of this invention is in use.

Figure 5:
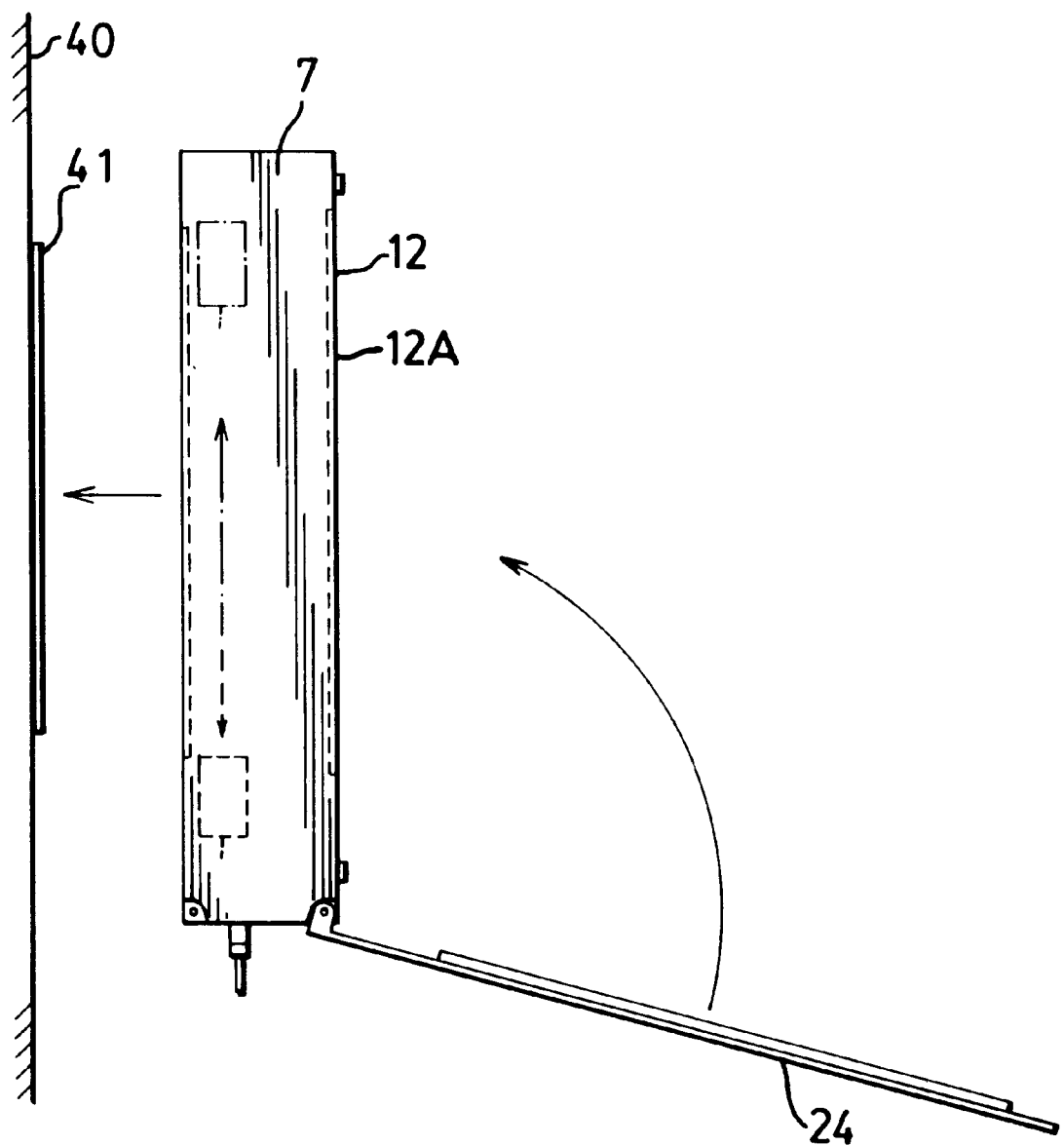
FIG. 5 is a side view of the preferred embodiment, illustrating the preferred embodiment in a position for scanning an image on a wall.

As illustrated in FIG. 5, in the event that the image 41 is mounted on the wall 40, the user of the preferred embodiment can move the case body 7 such that the first and second size indicating marks 101, 102 (see FIG. 2) are aligned with the boundary of the image 41 by virtue of the viewing area 12A on the viewing panel 12. The impervious cover member 24 is closed to cover the viewing area 12A once the preferred embodiment has been properly positioned relative to the image 41.

Figure 4:
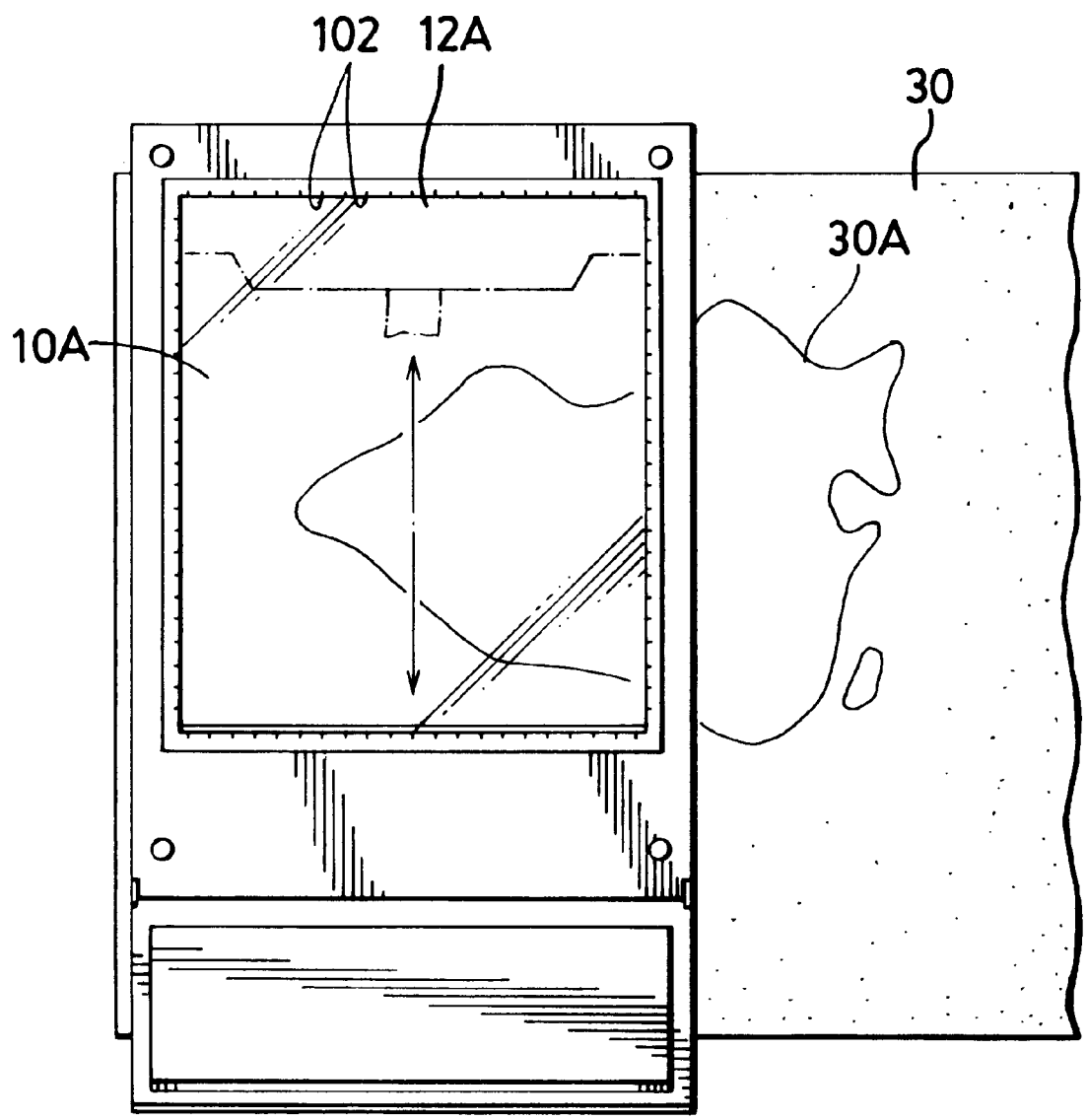
FIG. 4 illustrates how an image is viewed through a viewing area of the preferred embodiment.

Referring to FIG. 4, upon determining that a portion 30A of the image 30 is left outside of the scanning area 10A, the unscanned portion 30A of the image 30 can be marked with the aid of the second size indicating mark 102 via the viewing area 12A for processing in a succeeding scanning operation.

With this invention thus explained, it is apparent that numerous modifications and variations can be made without departing from the scope and spirit of this invention. It is therefore intended that this invention be limited only as indicated in the appended claims.

I claim:

1. An optical scanning device for scanning an image comprising:

a case body including a broad upper wall and a broad lower wall, said broad lower wall displaced from and parallel to said broad upper wall, said case body having a columnar hollow space extending downwardly from said broad upper wall to said broad lower wall so as to form an upper annular edge portion and a lower annular edge portion, respectively, on said upper and lower walls, said upper annular edge portion and said lower annular edge portion defining an upper annular opening and a lower annular opening, respectively;

transparent scanning panel fixedly secured to said upper annular edge portion to cover said upper annular opening, said upper annular edge portion defining a scanning area on an upper major surface of said transparent scanning panel;

a transparent viewing panel fixedly secured to said lower annular edge portion to cover said lower annular opening so as to define a viewing area through which said scanning area of said transparent scanning panel is visible;

a scanning module unit for optically scanning an image and for transforming the scanned image into a digital representation, said scanning module unit being disposed adjacent to and under said broad upper wall, said scanning module unit being movable in a transverse direction relative to said columnar hollow space, said case body being movable so as to juxtapose said upper major surface of said transparent scanning panel with said image so as to permit viewing of a boundary of the area of said image to be scanned via said viewing area of said viewing panel;

a light impervious cover member dimensioned to cover said viewing area and having a connecting lateral side which is selectively detachably hinged to said case body at one side thereof by a plurality of hinges adjacent to said lower wall and said upper wall such that said impervious cover member can be selectively brought into abutment with said viewing area when said optical scanning device is in use so as to shield said scanning module from external light sources, said hinges further allowing said impervious cover member to be brought into abutment with said scanning area of said transparent scanning panel to protect said scanning area when said optical scanning device is not in use.

2. The scanning device as recited in claim 1, wherein said transparent scanning panel further includes a first size indicating mark formed on said upper major surface so as to define said scanning area and a second size indicating mark formed on a lower major surface thereof which is aligned with and scaled to said first size indicating mark.

3. The scanning device as recited in claim 1, wherein said upper major surface of said transparent scanning panel is positioned to be co-planar with an upper surface of said broad upper wall.

4. The scanning device as recited in claim 3, further comprising a plurality of vertical studs disposed on corners of said broad lower wall and outwardly of the perimeter of said viewing area, wherein said impervious cover member further includes a cover pad disposed thereon which has a thickness greater than the height of said vertical studs such that said cover pad is brought into abutment with said viewing area to prevent light from entering into said case body through said viewing area when said optical scanning device is in use.

* * * * *